(12) United States Patent
Le et al.

(10) Patent No.: US 6,201,664 B1
(45) Date of Patent: Mar. 13, 2001

(54) POLYMER BUMPS FOR TRACE AND SHOCK PROTECTION

(75) Inventors: Hienminh Huu Le; Tzong-Shii Pan; Victor Wing Chung Shum, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/192,410

(22) Filed: Nov. 16, 1998

(51) Int. Cl.⁷ .................................................. G11B 21/16
(52) U.S. Cl. ...................................... 360/244.9; 360/245.9
(58) Field of Search .............................. 360/244.2, 244.3, 360/244.8, 244.9, 264.2, 245.9

(56) References Cited

U.S. PATENT DOCUMENTS

| | | | |
|---|---|---|---|
| 4,761,699 | 8/1988 | Ainslie et al. | 360/103 |
| 4,939,611 | 7/1990 | Connolly | 360/128 |
| 5,422,770 | 6/1995 | Alt | 360/105 |
| 5,612,840 | 3/1997 | Hiraoka et al. | 360/104 |
| 5,640,290 | 6/1997 | Khanna et al. | 360/105 |
| 5,673,484 | 10/1997 | Masaichi et a l. | 29/896.93 |
| 5,680,274 | 10/1997 | Palmer | 360/104 |
| 5,696,651 | 12/1997 | Endo et al. | 360/104 |
| 5,731,931 * | 3/1998 | Goss | 360/104 |
| 6,014,290 * | 1/2000 | Supramaniam et al. | 360/104 |
| 6,072,664 * | 6/2000 | Aoyagi et al. | 360/104 |

FOREIGN PATENT DOCUMENTS

| | | |
|---|---|---|
| 6-124558 | 5/1994 | (JP) . |
| 8-297817 | 11/1996 | (JP) . |

OTHER PUBLICATIONS

IBM Bulletin Jun. 1995 "High–Shock Resistant HSA/HAA".
IBM Bulletin Oct. 1995 "Flexure Design for High Shock".

\* cited by examiner

*Primary Examiner*—David L. Ometz
*Assistant Examiner*—Angel Castro
(74) *Attorney, Agent, or Firm*—Douglas R. Millett; Felsman, Bradley, Vaden, Gunter & Dillon, LLP

(57) ABSTRACT

A hard disk drive has actuator arms with a load beam or suspension extending from one end. Each suspension carries an integrated lead layer with electrical traces which are connected to a magnetic read/write heads for interacting with magnetic disks in the disk drive. Each suspension also has a pair of polymer pads on each side of the traces. Each pad has a series of bumps which give the pads a greater thickness than the lead layer for preventing contact between the traces, suspensions and magnetic disks during shock vibration. The pads also prevent contact between the trace conductors and the head separator during the separation process.

16 Claims, 2 Drawing Sheets

POLYMER BUMPS FOR TRACE AND SHOCK PROTECTION

CROSS-REFERENCE TO RELATED APPLICATION

This application is related to commonly assigned co-pending patent application attorney docket number JA9-97-007, entitled "Suspension Assembly With Resilient Shock Bumpers For A Disk Drive Device", and is incorporated herein by reference.

TECHNICAL FIELD

This invention relates in general to suspension assemblies in a hard disk drive and in particular to preventing a suspension assembly from damaging a magnetic disk in a hard disk drive and protecting conductor traces in the head stack assembly process.

BACKGROUND ART

Magnetic recording files such as hard disk drives are commonly known in the art. Hard disk drives typically employ a plurality of magnetic read/write heads on the end of movable suspension actuator arms to interact with magnetic disks. As the demand for higher capacity disk drives increases, the disk-to-disk spacing has been reduced. Hence, the suspensions are getting closer to the disks.

Because of these close-fitting requirements, hard disk drives must be able to withstand some shock vibration such as that experienced during handling. In some applications, hard disk drives must also be able to survive high G-force impacts. Shock vibration can cause the stainless steel actuator arms to come into contact with the magnetic disks and scratch them, or produce contamination particles. These particles can damage the disks and cause slider crashes. During the head stack assembly process, a separator clip is inserted between each of the suspensions. The insertion and removal of the separator generates particles due to the sharp edges of the flexure stainless steel. The separator also touches the conductive traces and may damage the gold coating, thereby creating reliability concerns.

One way to reduce the risk of particle generation is to add flanges on the flexure sides of the suspension. Unfortunately, this will add extra material to the suspension and one more forming process step to its manufacture. These disadvantages would add additional cost to the disk drive. An inexpensive device or feature is needed to eliminate contamination during the head separation process and to protect the traces and disks in high shock environments.

DISCLOSURE OF THE INVENTION

A hard disk drive has actuator arms with a load beam or suspension extending from one end. Each suspension carries an integrated lead layer with electrical traces which are connected to a magnetic read/write heads for interacting with magnetic disks in the disk drive. Each suspension also has a pair of pads on each side of the traces. The pads may be formed from polyamide or some other preferred polymer. Each pad has a series of bumps which give the pads a greater thickness than the lead layer for preventing contact between the traces, suspensions and magnetic disks during shock vibration. The pads also prevent contact between the trace conductors and the head separator during the separation process.

BEST MODE FOR CARRYING OUT THE INVENTION

Figure 1:
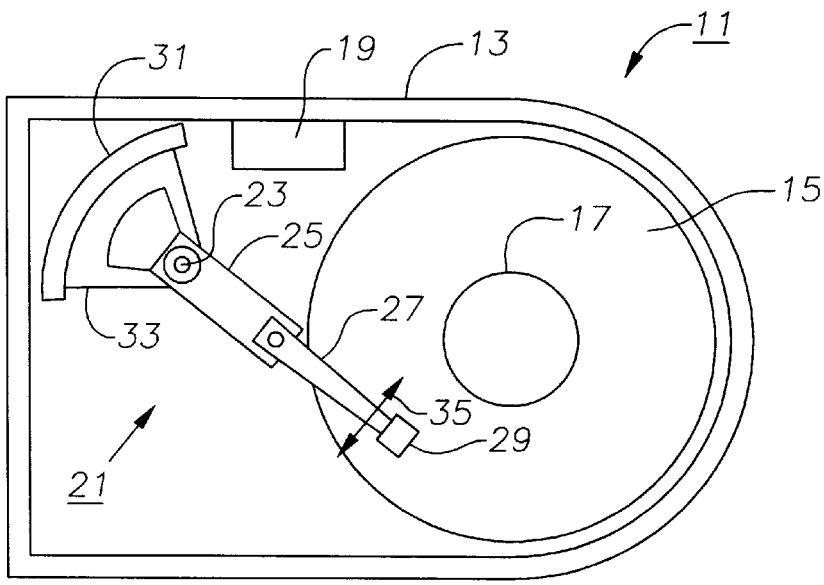
FIG. 1 is a schematic top view of a hard disk drive.

Referring to FIG. 1, a schematic drawing of an information storage system comprising a magnetic hard disk drive 11 is shown. Drive 11 has an outer housing or base 13 containing a plurality of stacked, parallel magnetic disks 15 (one shown) which are closely spaced apart. Disks 15 are rotated by a motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 as will be described below.

Figure 2:
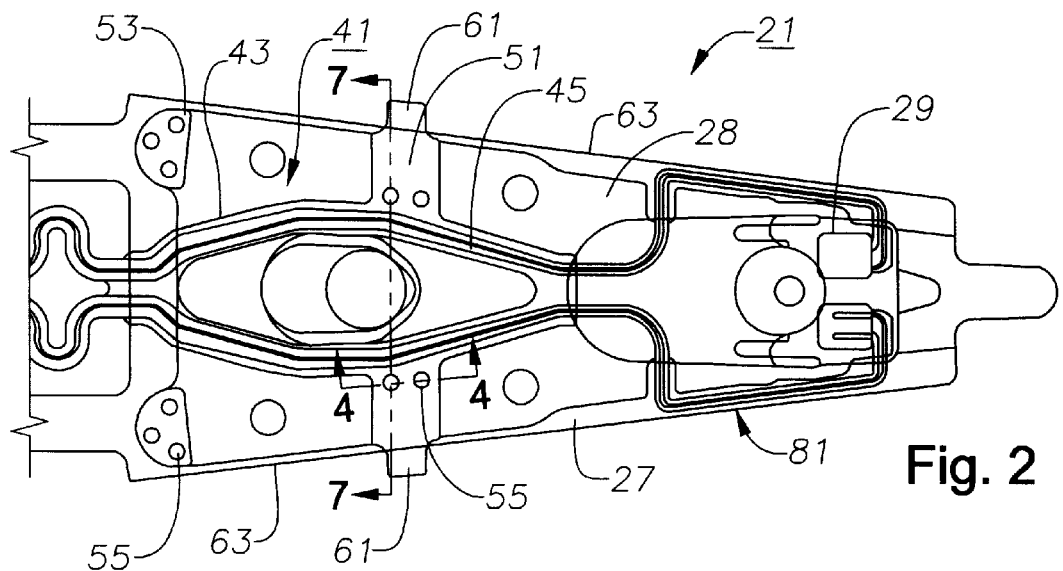
FIG. 2 is a plan view of a suspension in the hard disk drive of FIG. 1.
Figure 3:
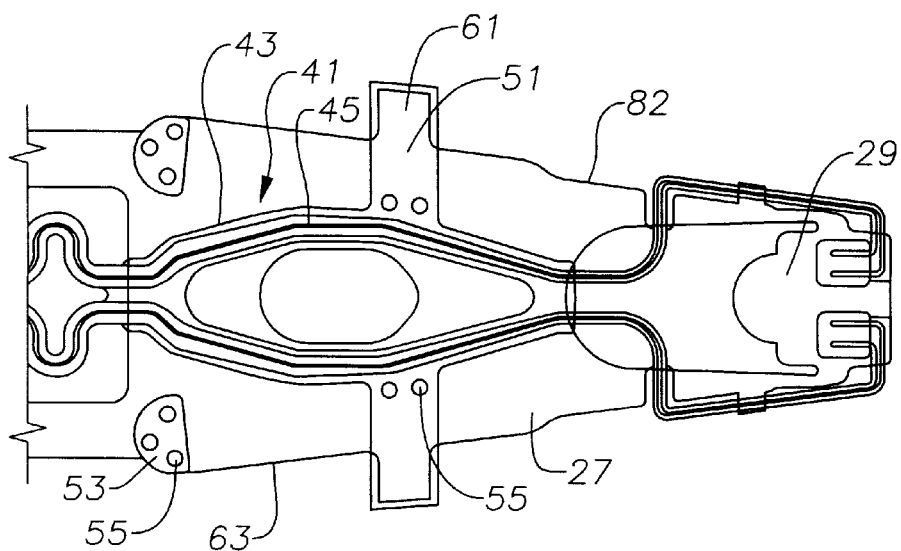
FIG. 3 is a plan view of an integrated gimbal suspension in the hard disk drive of FIG. 1.

As shown in FIGS. 1 and 2, each arm 21 comprises a mounting support 25, a cantilevered stainless steel load beams 27 and flexures 28 extending from mounting plate or support 25. Each arm 21 also has a head gimbal assembly 29 having at least one magnetic read/write head welded to it for magnetically reading data from or magnetically writing data to disks 15. Together, these elements form weldment or suspension 81. An alternative suspension design also known as a weldment or integrated gimbal suspension 82 is shown in FIG. 3. Each suspension 82 has a mounting support 25, a pair of load beams 27, a head gimbal assembly 29 with at least one head. Suspensions 82 do not have flexures 28. Suspensions 82 should be considered interchangeable with suspensions 81 throughout the remainder of this specification.

Suspensions 81 have a spring-like quality which biases or maintains them in parallel relationship relative to one another. A motor assembly 31 having a conventional voice coil motor is also mounted to pivot assembly 23 opposite head gimbal assemblies 29. Movement of an actuator drive arm 33 (indicated by arrow 35) moves head gimbal assemblies 29 radially across tracks on the disks 15 until the heads on assemblies 29 settle on the target tracks.

Figure 4:
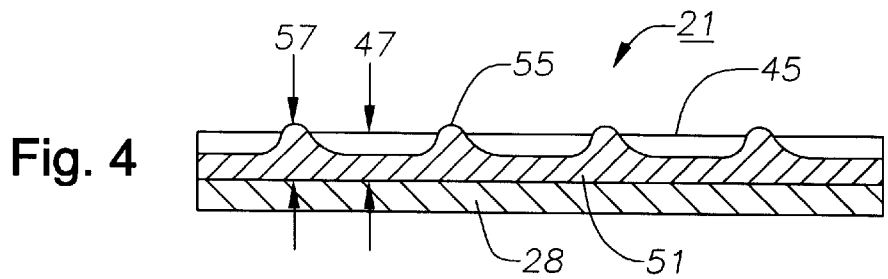
FIG. 4 is a sectional side view of the suspension of FIG. 2 taken along the line 4—4 of FIG. 2, and showing a first embodiment of a protective pad constructed in accordance with the invention.

Referring now to FIGS. 2 and 3, one surface of each arm 21 carries a thin integrated lead layer 41 having an insulative substrate 43 beneath a plurality of electrically conductive traces 45. In the preferred embodiment, substrate 43 is formed from polyamide or another polymer and traces 45 are formed from copper. Lead layer 41 extends from magnetic heads 29 along the length of arm 21 and is connected to controller 19. As shown in FIG. 4, lead layer 41 has a thickness or height 47 which is measured from a upper surface of flexure 28 to an upper surface of traces 45. Each arm 21 also has a pair of insulative pads 51, 53 mounted to flexure 28 on each side of traces 45. In the preferred embodiment, pads 51, 53 are formed from polyamide or another polymer.

Figure 5:
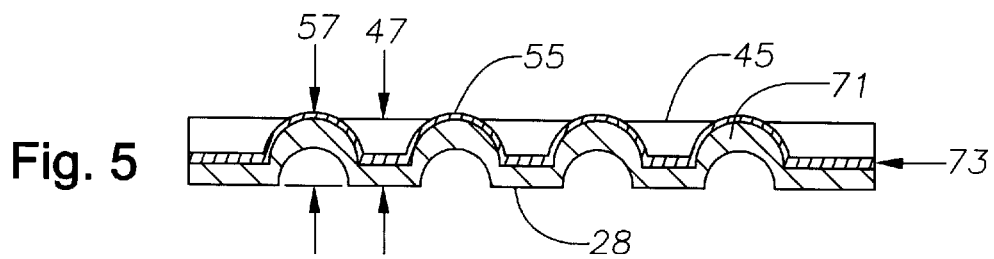
FIG. 5 is a sectional side view of the suspension of FIG. 2 showing a second embodiment of the protective pad.
Figure 6:
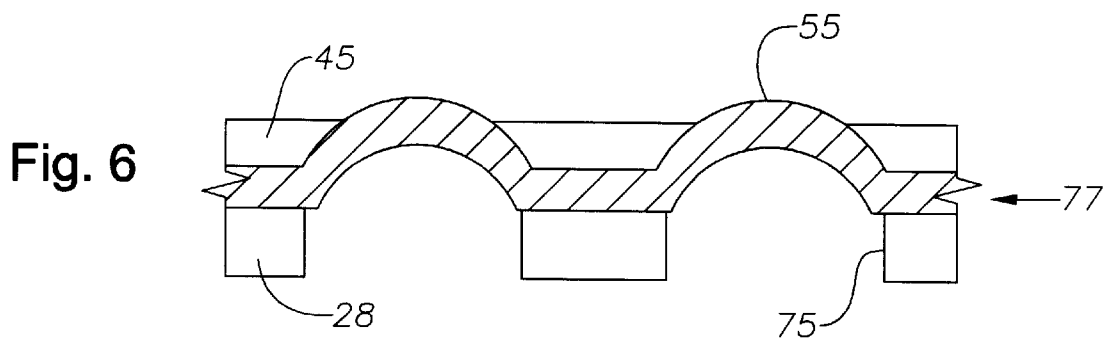
FIG. 6 is a sectional side view of the suspension of FIG. 2 showing a third embodiment of the protective pad.
Figure 7:
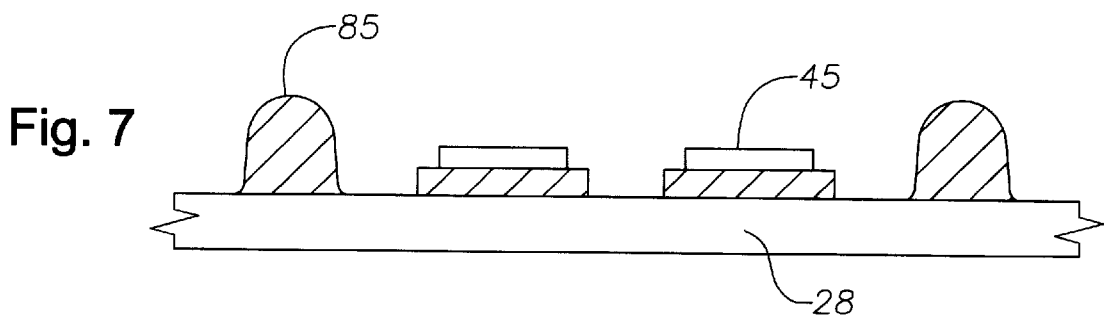
FIG. 7 is a sectional end view of the suspension of FIG. 2 taken along the line 7—7 of FIG. 2 and showing a fourth embodiment of the protective pad.

Each pad 51 has a plurality of protrusions or bumps 55 extending therefrom for providing additional height. With bumps 55, pads 51 have a height 57 which is greater than height 47 of lead layer 41 for preventing contact between traces 45 and magnetic disks 15 when hard disk drive I I is exposed to shock vibration. Bumps 55 also prevent contact between traces 45 and insertion tools such as a head separator. Bumps 55 may be formed on the trace side of flexure 28 by a local heat process such as a hot plate or laser texturing. In an alternate embodiment (FIG. 5), flexure 28 can be formed with protuberances or humps 71 and then coated with a polyamide layer 73 or other polymer on top of humps 71 to form bumps 55. Bumps 55 extend above conductor 45. A third embodiment is shown in FIG. 6. This version is similar to FIG. 5, but humps 71 are replaced by holes or voids 75. A polymer layer 77 is extends across voids 75 and is treated to form bumps 55. Alternatively, stainless steel may be etched onto the back of the polyamide on flexure 28 before a heat process is used to make bumps 55 from the load beam side. In FIG. 7, a fourth alternative shows stand-alone polymer guard rails or bumpers 85 on each side of traces 45. Pads 53 may also be formed with bumps 55 in any of these embodiments.

In FIGS. 2 and 3, a flange or side portion 61 of each pad 51 extends beyond a side edge 63 of flexure 28. Side portions 61 are provided to prevent contact between the sharp stainless steel edges of flexure 28 and a plastic head separator clip (not shown) for preventing the generation of particles from the separator clip.

In operation, disks 15 are rotated by the motor at a high speed about central drive hub 17. Arms 21 are pivoted along arrows 35 to place the heads on head gimbal assemblies 29 into various operational positions (FIG. 1) within an operational range on disks 15. The two head gimbal assemblies 29 mounted to the end of each arm 21 operate in a conventional manner and always move in unison with one another on opposite sides of a single disk 15.

If drive 11 is subjected to shock vibration, suspensions 81 will have a tendency to flex and oscillate into physical contact with disks 15. With pads 51, 53 installed, disks 15 will not be touched by the metal portions of suspensions 81 such as side edges 63 and traces 45, thereby reducing the possibility of scratching or damaging drive 1 1. Only the soft tips of bumps 55 will contact the disks 15.

The side portions 61 of pads 51 prevent a head separator clip (not shown) from touching the sharp stainless steel edges 63 of flexure 28 during the head separator insertion process. If contact between these elements was allowed, small particles of plastic from the separator clip would be generated which could potentially damage magnetic disks 15 and copper traces 45, and would create reliability problems for the hard disk drive.

The invention has several advantages. The polymer (e.g. polyamide) pads and bumps prevent contact between the disks, suspensions and traces to reduce the possibility of damage to the hard disk drive during shock vibration. They also protect the copper traces from touching the head separator during the assembly process. The side portions of the pads also prevent damage during head separator insertion and removal. This solution is also inexpensive compared to other options such as adding flanges to the suspension assembly.

While the invention has been shown or described in only some of its forms, it should be apparent to those skilled in the art that it is not so limited, but is susceptible to various changes without departing from the scope of the invention.

What is claimed is:

1. An integrated lead suspension for a hard disk drive having a rotatable magnetic disk and an actuator comb with a mount plate for pivotal interaction with the magnetic disk, comprising:

a weldment mounted to and extending from the mount plate;

an integrated lead layer mounted to the weldment and having a magnetic head with traces extending therefrom mounted on an insulative substrate, the lead layer having a height which is measured from a surface of the weldment to an outer surface of the traces; and a protrusion on the weldment adjacent to at least one lateral side of the traces, the protrusion having a height which is greater than the height of the integrated lead layer for preventing contact between the traces and a magnetic disk; and wherein the protrusion is formed from a material that is softer than the magnetic disk, and wherein the protrusion has at least one bump extending therefrom.

2. The suspension of claim 1 wherein the protrusion is formed from a polymer.

3. The suspension of claim 1, further comprising an elastomeric edge guard mounted to and extending beyond at least one lateral side edge of the weldment, the edge guard being adapted to prevent contact between a sharp edge of the weldment and a head separator.

4. The suspension of claim 1 wherein the protrusion comprises at least one pad adjacent to each lateral side of the traces.

5. The suspension of claim 1 wherein the protrusion comprises a protuberance formed in the weldment and an elastomeric coating on the protuberance.

6. The suspension of claim 1, further comprising a second protrusion on the weldment adjacent to at least one lateral side of the traces.

7. The suspension of claim 1, further comprising a flexure on the weldment, and wherein the lead layer and the protrusion are mounted on the flexure.

8. An integrated lead suspension for a hard disk drive having a rotatable magnetic disk and an actuator comb with a mount plate for pivotal interaction with the magnetic disk, comprising:

a weldment having a longitudinal axis and mounted to and extending from the mount plate;

an integrated lead layer mounted to the weldment and having a magnetic head with traces extending therefrom mounted on an insulative substrate, the lead layer having a height which is measured from a surface of the weldment to an outer surface of the traces;

an elastomeric protrusion on the weldment on each lateral side of its axis, the protrusions having a height which is greater than the height of the integrated lead layer for preventing contact between the traces and a magnetic disk; and at least one bump extending from each of the protrusions.

9. The suspension of claim 8 wherein the protrusions are formed from a polymer.

10. The suspension of claim 8, further comprising elastomeric edge guards mounted to and extending beyond lateral side edges of the weldment, the edge guards being adapted to prevent contact between a sharp edge of the weldment and a head separator.

11. The suspension of claim 8 wherein the protrusions comprise protuberances formed in the weldment and an elastomeric coating on the protuberances.

12. The suspension of claim 8, further comprising a second set of elastomeric protrusions on the weldment on each lateral side of the axis, the second set of protrusions being axially spaced apart from said protrusions.

13. The suspension of claim 8, further comprising a flexure on the weldment, and wherein the lead layer and the protrusion are mounted on the flexure.

14. An integrated lead suspension for a hard disk drive having a rotatable magnetic disk and an actuator comb with a mount plate for pivotal interaction with the magnetic disk, comprising:

a weldment having a longitudinal axis and mounted to and extending from the mount plate;

an integrated lead layer mounted to the weldment and having a magnetic head with traces extending therefrom mounted on polyamide, the lead layer having a thickness which is measured from a surface of the weldment to an outer surface of the traces;

a first set of polymer protrusions on the weldment on each lateral side of its axis;

a second set of polymer protrusions on the weldment on each lateral side of its axis, the second set of protrusions being axially spaced apart from the first set of protrusions; and elastomeric edge guards mounted to and extending beyond lateral side edges of the weldment, the edge guards being adapted to prevent contact between a sharp edge of the weldment and a head separator; and wherein at least some of the protrusions have a plurality of bumps extending therefrom and a thickness which is greater than the thickness of the integrated lead layer for preventing contact between the traces and a magnetic disk.

15. The suspension of claim 14 wherein each of the protrusions comprise protuberances formed in the weldment with a polymer coating on the protuberances.

16. The suspension of claim 14, further comprising a flexure on the weldment, and wherein the lead layer, the sets of polymer protrusions and the edge guards are mounted on the flexure.

* * * * *